March 1, 1960 R. WEISS 2,926,573
CARRYING CASE FOR PHOTOGRAPHIC CAMERAS
Filed July 23, 1956 7 Sheets-Sheet 4

March 1, 1960 R. WEISS 2,926,573
CARRYING CASE FOR PHOTOGRAPHIC CAMERAS
Filed July 23, 1956 7 Sheets-Sheet 7

United States Patent Office 2,926,573
Patented Mar. 1, 1960

2,926,573
CARRYING CASE FOR PHOTOGRAPHIC CAMERAS

Richard Weiss, Braunschweig, Germany, assignor to Franke & Heidecke, Fabrik Photographischer Präzisions-Apparate, Braunschweig, Germany, a firm Application July 23, 1956, Serial No. 599,416

10 Claims. (Cl. 95—11)

This invention relates to a carrying case for photographic cameras, and especially to what is called an ever-ready case, this expression in the photographic equipment industry being understood to refer to a construction in which, within a very brief period of time of a few seconds, and with a very few simple motions, the parts may be manipulated from a camera-enclosing position to a picture-taking position.

An object of the invention is the provision of a generally improved and more satisfactory carrying case, particularly one of the ever-ready type.

Another object is the provision of a carrying case which affords all parts of the camera complete protection when the case is closed, without impeding opening of the case and readying of the camera for taking a picture.

Still another object is the provision of a carrying case having the ever-ready characteristics of quick opening and quick readying of the camera for picture-taking, which at the same time provides complete hermetical sealing of the case when it is closed, protecting the contained camera not only against impact shocks but also against access of dirt, rain, sand, chemical fumes, or other undesirable atmospheric effects such as tropical conditions or arctic conditions, and if necessary even protecting it against access of water under pressure, as for example when the entire case is accidentally immersed in water.

A further object is the provision of a carrying case in which, in spite of the greatly increased protection afforded by this case as compared with many of the prior carrying cases, the time and effort required to make the camera ready for picture taking are not appreciably increased over those required when using prior cases which provide less protection for the camera.

A still further object is the provision of a carrying case having the various advantages above mentioned, which at the same time is particularly although not exclusively intended for use with high-grade precision cameras of the twin lens reflex type, especially the well known Rolleiflex and Rolleicord cameras manufactured in Germany and widely sold throughout the United States and elsewhere.

These and other desirable objects may be attained in the manner disclosed as an illustrative embodiment of the invention in the following description and in the accompanying drawings forming a part hereof, in which.

The same reference numerals throughout the several views indicate the same parts.

As already indicated, the ever-ready carrying case of the present invention is intended particularly but not exclusively for photographic cameras of the twin lens reflex type, and especially for the high-grade cameras made in Germany and sold widely in the United States and elsewhere, under the trademarks Rolleiflex and Rolleicord. Those not already familiar with the construction of such cameras are referred to the book "Rollei Photography; Handbook of the Rolleiflex and Rolleicord Camera," by Jacob Deschin, published in 1952 by the Camera Craft Publishing Company, of San Francisco, California. As will be apparent to those familiar with the mentioned cameras, either from experience with the cameras themselves or from reading the above mentioned book, the particular camera illustrated in Figs. 2, 3, and 4 of the present drawings will be recognized at once as a Rolleiflex camera, here shown as a typical example of the usefulness of the present carrying case. But, as mentioned, the invention is applicable also to the companion Rolleicord camera and to various other cameras of other makes, preferably but not necessarily of the twin lens reflex type.

United States Patent 2,681,600, granted June 22, 1954, for an invention of R. Heidecke, illustrates a prior form of ever-ready carrying case for a Rolleiflex or Rolleicord camera or other twin lens reflex camera. It will be observed, however, that the carrying case as disclosed in this prior patent does not seal hermetically, and does not give the camera complete protection from all sides, because the winding crank or winding knob on the right hand side wall of the camera body and the focusing knob on the left hand side wall project through openings in the right and left hand side walls of the carrying case, in order to allow for necessary manipulation. As distinguished from the carrying case of said prior patent, and other similar carrying cases, the case of the present invention completely encloses all parts of the camera and is hermetically sealed when the case is in fully closed condition, thus protecting the camera even against such difficult conditions as sandstorms, rain, tropical atmosphere, or temporary accidental immersion in water. Yet only a few simple manipulations, requiring only a moment of time, will serve to make the camera ready for picture taking.

Referring now to the drawings and especially at first to Figs. 1–4, the carrying case of the present invention consists of two hollow or cup-like parts or sections 1 and 2, preferably made of some stiff and impervious material such as sheet metal, mating with each other in complementary fashion when closed, and connected to each other at their bottom edges by means of a hinge pin 3 secured to brackets or lugs on the section 2, and engaging in slightly oval or elongated slots 4 on brackets or lugs on the section 1, so that when the two sections are swung to closed position and are drawn tightly toward each other by the latching mechanism described below, they may move slightly toward each other around the entire periphery of the joint between the two sections, to exert hermetical sealing pressure against an interposed gasket or packing ring 6 made of rubber or the like and mounted in a channel 5 formed in the section 2. In this way, when the packing ring 6 is tightly compressed between the two sections, around the entire periphery of the joint, the case is sealed in an impervious manner.

The section 1 of the case may be referred to for convenience as the stationary section or main section or body section, and is supported from the neck or shoulder of the user by means of a carrying strap 8 having its ends secured to opposite side walls of the main section 1 by means of studs 7, so that the section 1 is normally held in the upright position shown in Figs. 1 to 4. The other section 2 may be referred to for convenience as the cover or closure section.

Figure 1:
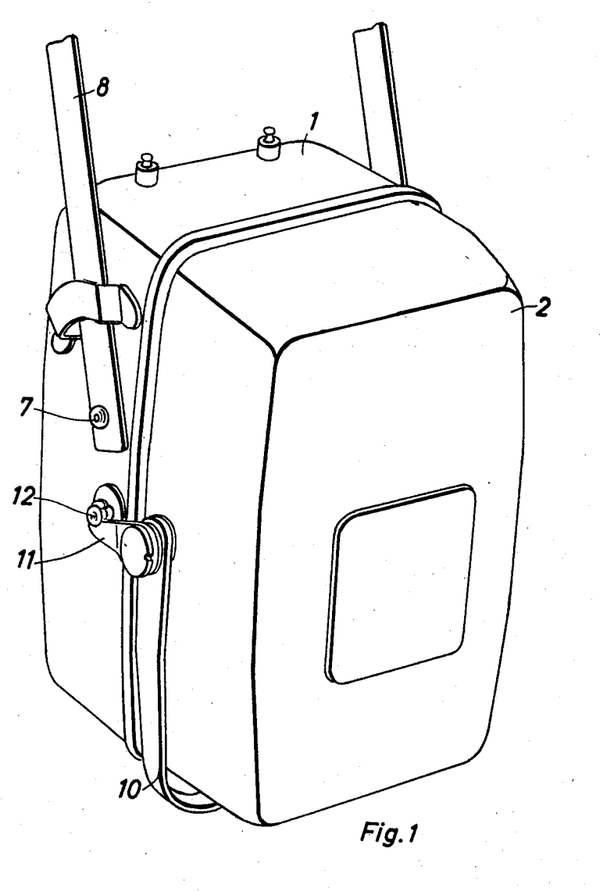
Fig. 1 is a perspective view of a carrying case in accordance with a preferred embodiment of the invention, showing it in fully closed position.
Figures 7A, 7B:
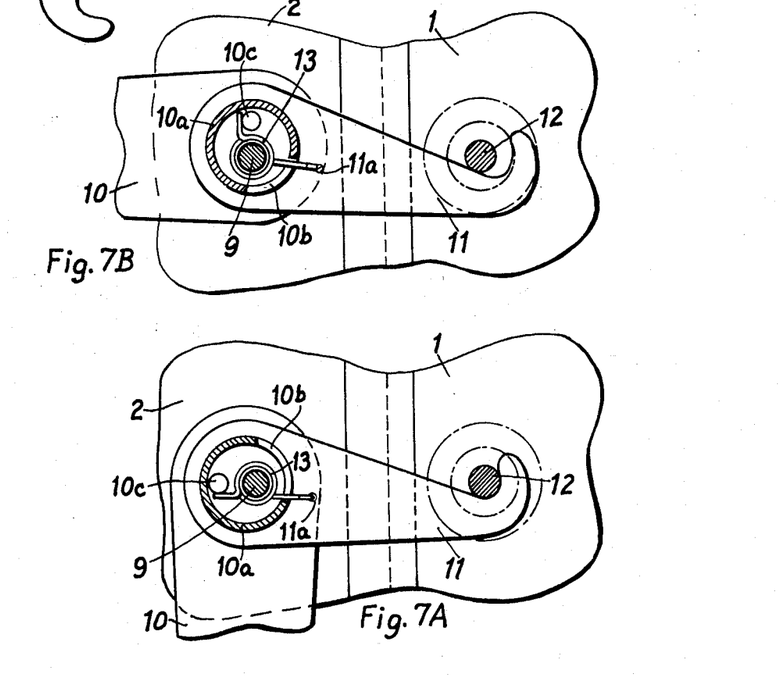
Fig. 7A is a fragmentary side elevation of the case in closed position, illustrating the latch or lock which holds the case sections together, in its fully closed position.
Fig. 7B is a similar view showing the latch partially released.
Figure 7C:
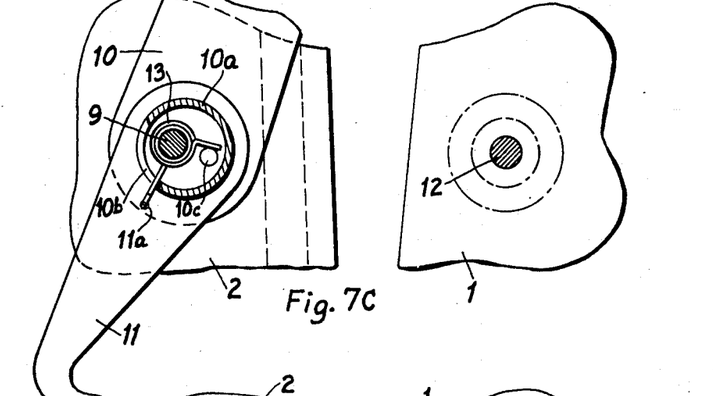
Fig. 7C is a similar view showing the latch fully released and the sections of the case moved to partially open position.

For holding the two sections in tightly closed position relative to each other, there is the latching mechanism partially shown in Fig. 1, and shown in more detail in Figs. 7A to 7C. This mechanism includes a manipulating member in the form of a bowed or bail-like handle 10 of U-shaped formation, the ends of the member 10 being journaled on pins or studs 9 on the side walls of the cover section 2 about midway of the height thereof. Fixed to and projecting outwardly from the outer faces of the side arms of the handle 10 are large hollow studs 10a in eccentric relation to the axes of the pivot studs 9. A pair of hooks 11 (one on each side of the carrying case) are rotatably mounted on the eccentric studs or bosses 10a. The hooked ends of these hook members 11 are adapted to engage stationary pins 12 projecting laterally from the side walls of the main body section 1 of the carrying case.

The eccentric relation of the pins 9 on which the handle 10 is journaled to the hollow studs 10a on which the hooks 11 are journaled is such that when the manipulating handle member 10 is swung down to its lowest position, extending below the bottom of the cover section 2 as in Figs. 1 and 7A, the studs 10a of the hooks 11 are moved to their farthest position forwardly, in a direction away from the pins 12, thus causing the hooks 11 to engage tightly with the pins 12 and draw the two sections of the carrying case tightly together to exert the desired sealing pressure on the interposed gasket 6. When the manipulating handle 10 is swung forwardly and upwardly across the front of the cover section 2, the eccentric action loosens the pull of the hooks 11 on the pins 12, as shown in Fig. 7B, and then further upward swinging movement of the handle 10 to a position across the top wall of the cover section 2 (as in Figs. 3 and 4) causes the springs 13 within the pivots 10a to swing the hooks 11 completely away from the pins 12 so that the cover section 2 may now be swung open (on its hinge 3, 4) to any extent desired.

These springs 13 are wound around the pins 9 within the hollow studs 10a. One end of each spring extends approximately radially outwardly through an arcuate circumferential slot 10b in the stud 10a, and is fixed to the hook 11 as by being bent laterally to extend into a small hole 11a in the hook member. The opposite end of the spring projects radially and is engaged behind and may, if desired, be fixed to a pin 10c which is fixed to the handle 10 within the hollow stud 10a. The relaxed position of each spring tends to hold its connected hook member 11 approximately in longitudinal alinement with the handle 10, because of the engagement of the long end of the spring 13 with the counterclockwise end of the slot 10b, as seen in Figs. 7B and 7C. But if the handle 10 is swung further counterclockwise from the position shown in Fig. 7B toward the position of Fig. 7A, when the hook member 11 is already engaged with the pin 12 and cannot swing counterclockwise, the spring 13 will simply wind up to some extent so that the motion of the handle 10 may continue.

When the parts are to be closed and sealed, the action is substantially the reverse of the opening action above described. The cover 2 is first swung upwardly against the front of the body section 1, then the handle 10 is swung forwardly and downwardly and rearwardly again, through approximately 180 degrees, from the released or rest position shown in Figs. 3, 4, and 7C to the fully closed and clamped position shown in Figs. 1 and 7A. Approximately the first 90 degrees of this downward swinging of the handle 10 serves to swing the hooks 11 into position to engage with the pins 12, as in Fig. 7B, and approximately the next or final 90 degrees of swinging movement of the handle from the position of Fig. 7B to the position of Fig. 7A serves, through the eccentric action, to tighten the hooks 11 against the pins 12, the springs 13 meanwhile becoming slightly wound up and serving to hold the hooks 11 against the pins 12 while the tensioning pressure is being applied to the hooks.

Figure 2:
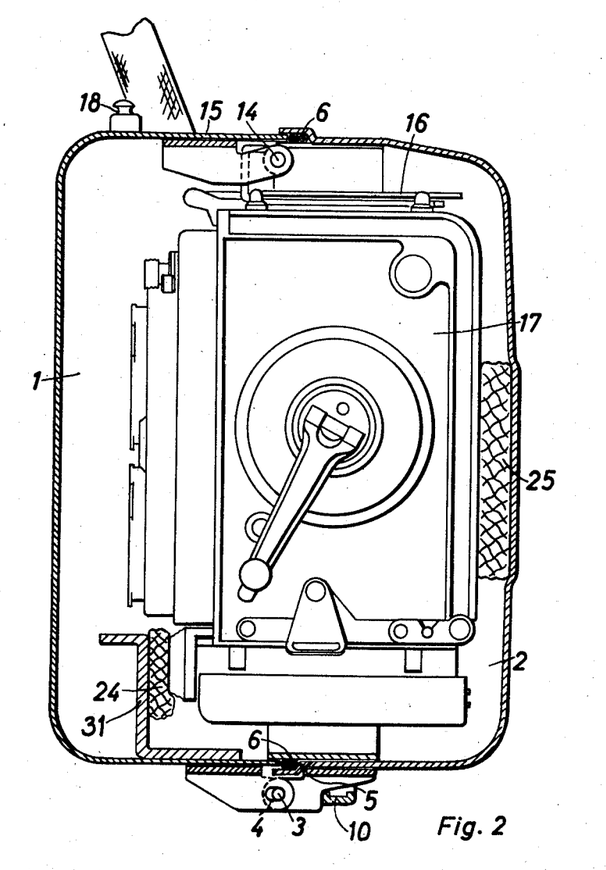
Fig. 2 is a vertical section through the same, also illustrating the camera within the case.
Figure 3:
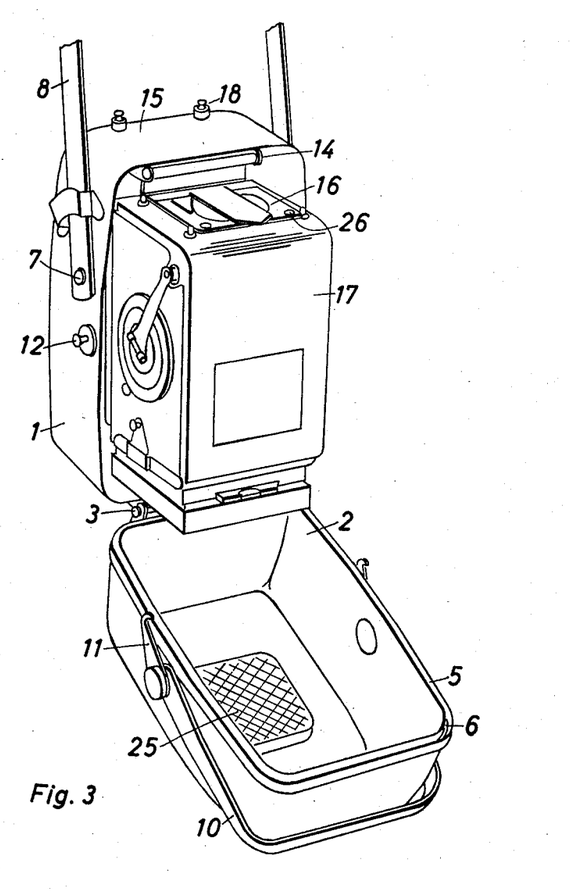
Fig. 3 is a view of the case in partially open position, with the camera still inside.
Figure 6:
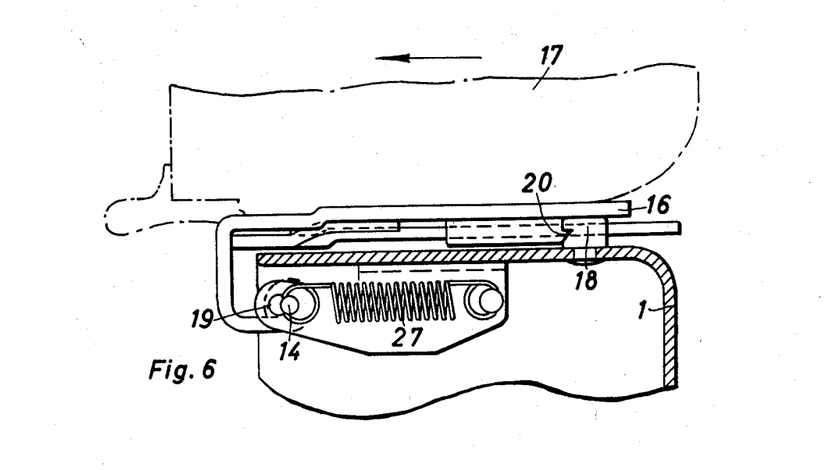
Fig. 6 is a fragmentary vertical section, on a larger scale, of the mechanism shown in Fig. 5, also illustrating additional parts.

According to the present invention, the camera itself is hingedly connected to the main body section 1 of the carrying case, in such manner that the camera will be in an inverted or depending position when it is within the case, and may be swung forwardly and upwardly to an erect position standing on top of the section 1 for picture taking purposes. To accomplish this, the inside of the main section 1 of the case is provided with a transverse pivot or hinge pin 14, extending horizontally just below and slightly behind the upper forward edge of the top wall 15 of this section 1, as seen in Figs. 2 and 3. Hinged to swing on this pivot 14 is a plate 16 of somewhat U-shaped formation as seen from the side as in Fig. 6, with one (the main) leg of the U much longer than the other, and with the hinge connection being at the free end of the shorter leg.

The camera body is indicated in general at 17. To those familiar with the specific cameras above mentioned, the camera body illustrated in the drawings will be recognized at once as a Rolleiflex camera, although it will be obvious that a Rolleicord camera could be substituted, and many if not all of the features of the present invention may be used also with other makes or kinds of cameras, or other photographic equipment.

Both the Rolleiflex and Rolleicord cameras have a tripod screw socket in the bottom wall of the camera, and the same is true of most other modern cameras. According to the present invention, the camera rests on the main part of the plate 16 and is secured thereto either by a screw entering the tripod screw socket of the camera body, or preferably by one of the various known forms of quick attachable mounting means for holding a photographic camera on a support, such as the mounting means shown in the copending United States patent application of Richard Weiss, Serial No. 532,219, filed September 2, 1955, now Patent No. 2,824,503, or the mounting means shown in the copending United States patent application of Gustav Bethmann, Serial No. 532,303, filed September 2, 1955, now Patent No. 2,824,504. The exact details of the way in which the camera is mounted on the plate 16 are unimportant for purposes of the present invention, so long as the camera is secured to the plate firmly and in a manner which can be readily and conveniently detached when required.

The camera is mounted on the plate 16 in such position that when the camera is contained within the closed carrying case, it hangs inverted, in the position shown in Fig. 2, with what is really the top of the camera at the bottom, and with the bottom at the top, and with the picture-taking lens and finder lens pointing rearwardly, as shown. When the cover member 2 of the carrying case is swung forwardly and downwardly from the closed position shown in Fig. 2 to an open position as shown for example in Fig. 3, the top of the camera (now at the lower end thereof) may be grasped and swung forwardly and upwardly, swinging the entire camera and its mounting plate 16 about the hinge axis 14 until the camera comes to rest on the top wall 15 of the carrying case, in the position shown in Fig. 4. This position is approximately 180 degrees from the previous position shown in Figs. 2 and 3, so that the picture-taking lens and finder lens of the camera now point forwardly rather than rearwardly, and the camera is in proper erect position ready for normal picture taking operation. The usual collapsing focal hood at the top of the camera body may be erected from the collapsed position shown in Figs. 2 and 3 to the erect position shown in Fig. 4. Since the camera is now completely free and unobstructed at all sides (except for the very slight obstruction of the carrying straps 8, which can be easily displaced as required) it is seen that the manipulation of the camera in picture taking operations is extremely easy and can be accomplished just as well as though there were no carrying case whatever, the manipulations being considerably easier than in some of the prior so-called ever-ready cases, since many of these cases do interfere to some extent with the manipulation of the camera parts.

Figure 5:
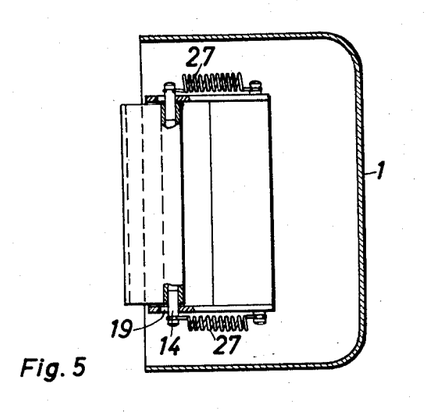
Fig. 5 is an inverted plan view (looking upwardly from the center of the case toward the top wall) with parts in section, of part of the mechanism for latching the camera in picture-taking position.

Cooperating parts on the plate 16 and on the top wall 15 of the carrying case are provided, to engage with each other in order to maintain the camera in normal picture taking position when it has been placed in that position, and keep it from accidentally tilting forwardly on the hinge 14. This is accomplished by providing a pair of anchoring studs 18 projecting upwardly from the top wall 15 of the case, in position to engage with the plate 16 near its rear edge, when the plate is folded to the overlying position for picture taking. The studs 18 preferably have heads which are undercut. The plate 16 has a beveled edge 20 (Fig. 6) which engages the undercut grooves in the studs 18, thereby locking the plate 16 to the studs and holding it against accidental upward swinging movement so long as the edge 20 remains engaged. Such engagement is automatically effected by the springs 27 (Figs. 5 and 6) which pull rearwardly on the hinge pivot 14 at all times, it being remembered that this hinge pivot extends through elongated bearing slots 19 in the bracket. To release the parts so that the camera and the plate 16 may be swung on the hinge 14, the camera body and plate 16 are first pushed forwardly against the force of the springs 27, to release the beveled edge 20 from the undercut portions of the studs 18.

This is the preferred construction for anchoring the camera in picture-taking position. If desired, however, a somewhat simpler construction may be used, the anchoring studs 18 merely being pressed into mating openings in the plate 16, in which they have a snug frictional fit. When such a frictional anchoring means is used, it is not necessary to employ the springs 27 nor the elongated slot 19, and the plate 16 may be hinged to the case by a conventional hinge.

Figures 8, 9B:
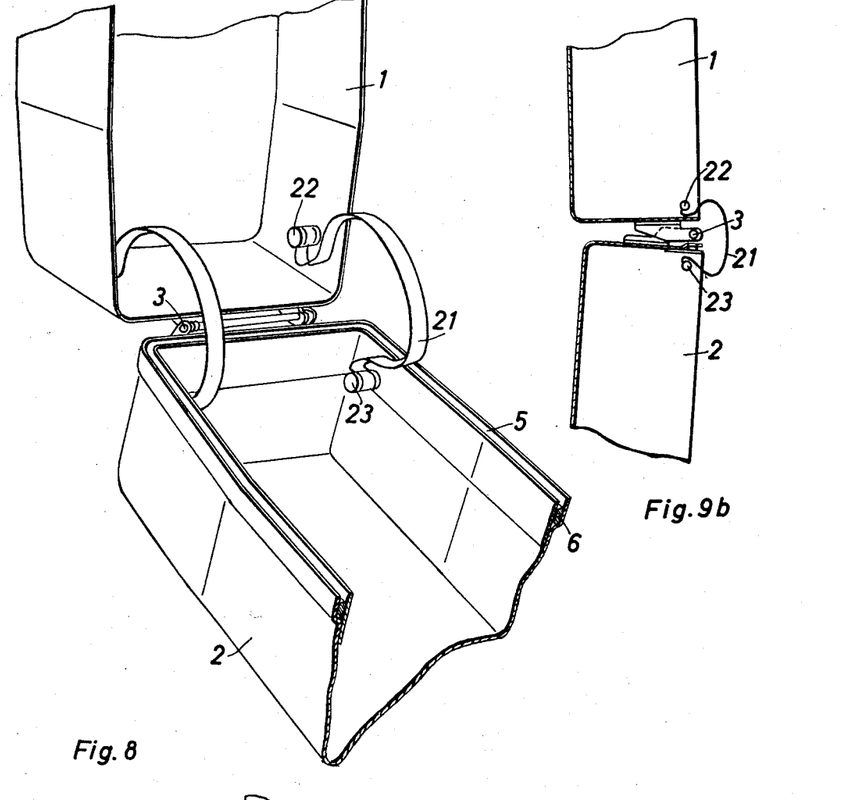
Fig. 8 is a perspective view of portions of the two sections of the case, particularly illustrating the spring which tends to swing the sections of the case to one or the other of their extreme limit positions relative to each other.
Fig. 9B is a diagrammatic view illustrating the action of the spring when tending to swing the sections of the case to fully opened position.
Figure 9A:
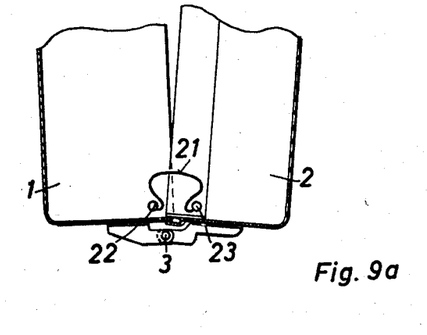
Fig. 9A is a diagrammatic view of the action of the spring when swinging the sections of the case to closed position.

It is desirable also to provide the sections of the case with what may be called double acting dead-center springs which will tend to keep the case either fully closed or fully open. These springs, shown at 21 in Figs. 8, 9A, and 9B, are arranged close to the inner faces of the side walls of the case, and are of generally U-shaped form with their ends fixed to studs 22 on the main body section 1 of the case and to studs 23 on the cover section 2 of the case. The U-shaped springs tend to close the bow or loop of the springs; that is, tend to pull the studs 22 and 23 toward each other. As will be seen from Figs. 9A and 9B, the tendency to pull the studs 22 and 23 toward each other will tend to keep the cover 2 in tightly closed condition so long as the line joining the studs 22 and 23 lies above the hinge pivot 3.

As the cover is swung farther open, a dead-center point is reached, at which the line from the stud 22 to the stud 23 passes through the hinge 3. When the cover is opened still farther beyond this dead-center position, the springs 21, tending to draw the stud 22 toward the stud 23, will thus swing the cover 2 to its extreme open position as shown in Fig. 9B.

To protect the camera from shocks when it is within the closed carrying case, the bottom portion of the main section 1 of the carrying case is provided with a fixed flange 31 (Fig. 2) on which is mounted a buffer 24 of foam rubber or similar suitable material, in position to bear against a suitable part of the camera body, such as the usual flat front plate formed at the top of Rolleiflex and Rolleicord cameras, and in some other cameras of the twin lens reflex type. Also, the cover section 2 of the carrying case is provided, approximately centrally of its front wall, with a buffer pad 25 of foam rubber or other suitable resilient material, the parts being so dimensioned and proportioned that when the case is tightly closed, the pad 25 presses against the camera back (which now faces toward the front, on account of the camera being swung 180 degrees on the hinge 14 from its normal picture taking position) and forces the camera gently but snugly against the pad 24. The camera is thus held by what may be termed a three-point suspension or contact, one point being the hinge 14, the second being the pad 24, and the third being the pad 25 which exerts pressure in the direction of a line passing between the two points 14 and 24.

The handling of the camera when using a carrying case according to the present invention is extremely simple. Initially, the camera, after being loaded, is secured to the plate 16 by the suitable securing device above mentioned. Then the camera is swung downwardly into the case, the cover 2 of the case is swung upwardly and rearwardly to the closed position shown in Fig. 2, and the bail handle 10 is swung forwardly and downwardly from a position extending across the top of the case to a position extending across the bottom, as in Fig. 1. This hermetically locks and seals the case under pressure, on account of the eccentric action of the pivots of the hooks 11, thereby creating a sealing pressure on the gasket or packing 6.

Figure 4:
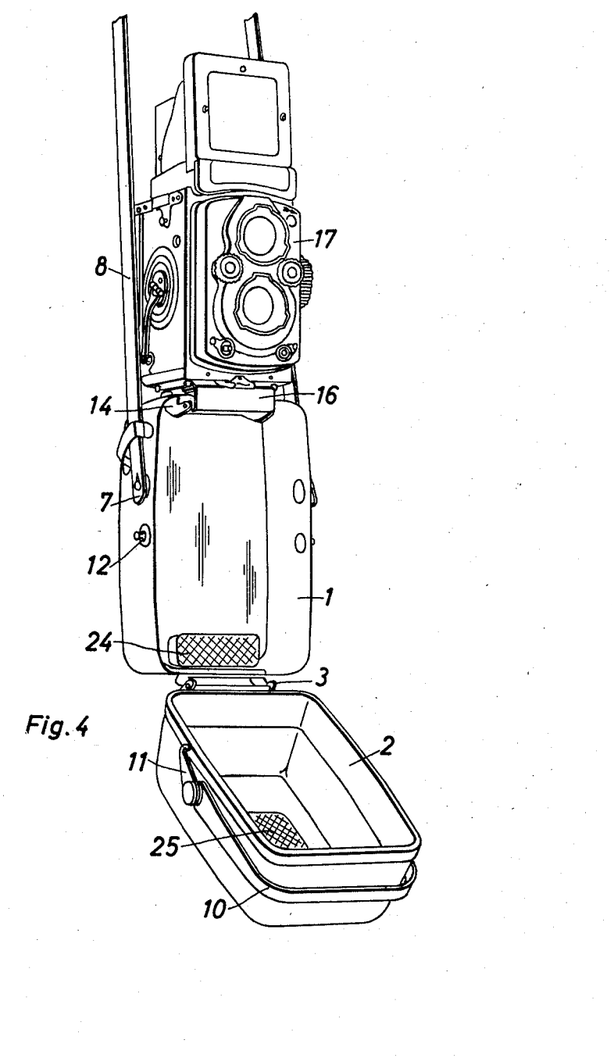
Fig. 4 is a view similar to Fig. 3 except that the camera has been swung outwardly and upwardly to the picture-taking position.

To open the case and make the camera ready for picture taking, only a few simple motions are necessary, which can be performed very quickly. First, the bail handle 10 is swung upwardly 180 degrees from the locked position of Fig. 1, so as to extend across the top of the cover section 2 of the case. This releases the pressure of the latching hooks 11 and also swings the hooks out of the way. Next the entire cover of the carrying case is swung forwardly and downwardly, whereupon the springs 21 will automatically continue the downward movement of the case to its final fully opened position shown in Fig. 9B. Then the camera body, in the depending or inverted position shown in Fig. 3, is grasped and swung forwardly and upwardly 180 degrees on its hinge 14, so that the camera now sits on top of the upper wall 15 of the case in the erect or upright position, approximately as shown in Fig. 4. The camera is now completely accessible on all sides, and may be manipulated just as though no carrying case were involved. These various motions for making the camera ready for taking the picture can actually be performed with great rapidity, quicker than the time it takes to describe them. The studs 18 firmly anchor the camera against accidental displacement when it is in picture taking position, yet when it is desired to replace the camera in the carrying case, this may be done very quickly by first pushing the camera slightly forwardly to overcome the rearward pull of the springs 27, so as to release the edges 20 from the undercut grooves of the studs 18, when this particular arrangement is used. If the studs 18 are mere tight press studs, without employing the resilient locking arrangement shown in Fig. 6, then a slight forward push at the top of the camera will serve to separate the plate 16 from the frictional grip of the studs 18.

This carrying case has been particularly described in connection with a photographic camera, because it is here that the case is expected to find its greatest usefulness. However, various other auxiliary photographic devices or other forms of photographic equipment may also be mounted in the carrying case of the present invention, with the same advantages of complete protection during transit and quickness and ease of making the apparatus ready for use when required. Therefore, in this specification and in the accompanying claims, the terms "apparatus" and "appliance" and "photographic apparatus" and "photographic appliance" are understood to refer to various other items of equipment in addition to cameras, including for example, light meters, range finders, lighting or illuminating equipment, motion picture cameras as distinguished from still cameras, etc.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. An ever-ready case for a photographic camera of the twin lens reflex type, comprising two hollow cup-like casing sections of rigid and moisture-impervious material mating tightly with each other when in closed position and adapted to be moved to an open position relative to each other, a gasket extending around the perimeter of the mating joint between the two sections, eccentric clamping means for drawing the two sections tightly toward each other to compress said gasket to achieve substantially hermetical sealing of the interior of the case when the two sections are closed and clamped, one of said sections having a top wall, a camera carrier hinged to said one of said sections adjacent said top wall to swing from a position wholly within said case to a position in which at least a substantial part of said carrier overlies said top wall exteriorly of said case, and means for securing the bottom of a twin lens reflex camera to said carrier in such position that when said carrier is in a position wholly within said case, the camera also lies within said case hanging downwardly from said carrier in an inverted position, and when said carrier is swung to said position overlying said top wall, said camera swings with it to an erect picture-taking position above said top wall of the case.

2. An ever-ready case for a photographic appliance, comprising a rear case section and a front case section mating with each other at an approximately vertical joint, a gasket on one of said sections extending around the perimeter of said joint in position to be engaged by the other of said sections to form a tight seal between the two sections when they are closed, hinge means connecting the two sections to each other adjacent their bottom ends so that said front section may swing forwardly and downwardly relative to said rear section while the latter remains substantially stationary, a pair of carrying strap securing means on said rear case section, a carrying strap extending between said securing means by which the case may be supported both when said sections are closed and when said front case section is in its forward and downward position, clamping means carried by and movable bodily with said front section for engaging said rear section to draw the two sections firmly toward each other, and an appliance mounting member hinged to said rear section to swing on a hinge axis supported from said rear case section and arranged substantially horizontally below and approximately parallel to the front edge of the top wall of said rear section, to swing from a position below said top wall through approximately 180 degrees to a position above said top wall, the parts being so arranged that a photographic appliance mounted on said mounting member may occupy a depending inverted position hanging downwardly within said case when closed, and may swing with said mounting member on the hinge axis thereof to an erect upstanding position above the top wall of said rear section when said case is open.

3. A construction as defined in claim 2, in which said photographic appliance is a camera including a lens having an optical axis pointing rearwardly when said camera is in its depending inverted position and pointing forwardly when said camera is in its erect upstanding position.

4. A construction as defined in claim 2, including means releasably anchoring said mounting member to the top wall of said rear section of said case.

5. An ever-ready case for a photographic appliance, comprising a rear case section and a front case section mating with each other at an approximately vertical joint, a gasket on one of said sections extending around the perimeter of said joint in position to be engaged by the other of said sections to form a tight seal between the two sections when they are closed, hinge means connecting the two sections to each other adjacent their bottom ends so that said front section may swing forwardly and downwardly relative to said rear section while the latter remains substantially stationary, clamping means carried by and movable bodily with said front section for engaging said rear section to draw the two sections firmly toward each other, and an appliance mounting member hinged to said rear section to swing on a hinge axis supported from said rear case section and arranged substantially horizontally below and approximately parallel to the front edge of the top wall of said rear section, to swing from a position below said top wall through approximately 180 degrees to a position above said top wall, the parts being so arranged that a photographic appliance mounted on said mounting member may occupy a depending inverted position hanging downwardly within said case when closed, and may swing with said mounting member on the hinge axis thereof to an erect upstanding position above the top wall of said rear section when said case is open, said photographic appliance being a camera including a lens having an optical axis pointing rearwardly when said camera is in its depending inverted position and pointing forwardly when said camera is in its erect upstanding position, means releasably anchoring said mounting member to the top wall of said rear section of said case, said anchoring means including a notched stud extending upwardly from said top wall of said rear section, a nose portion on said mounting member for engaging the notch of said stud, said mounting member having a loose connection with said rear section to be capable of limited horizontal movement relative thereto, and spring means tending to move said mounting member relative to said rear section in a direction to keep said nose engaged in said notch.

6. An ever-ready case for a photographic appliance, comprising a rear case section and a front case section mating with each other at an approximately vertical joint, a gasket on one of said sections extending around the perimeter of said joint in position to be engaged by the other of said sections to form a tight seal between the two sections when they are closed, hinge means connecting the two sections to each other adjacent their bottom ends so that said front section may swing forwardly and downwardly relative to said rear section while the latter remains substantially stationary, a pair of carrying strap securing means on said rear case section, a carrying strap extending between said securing means by which the case may be supported both when said sections are closed and when said front case section is in its forward and downward position, a bail-like handle pivotally mounted on said front section for swinging movement relative thereto through approximately 180 degrees, a pair of clamping hooks eccentrically mounted on said handle for engaging said rear section to draw the two sections tightly together when said two sections are in predetermined position relative to each other and said handle is swung from one predetermined position to another predetermined position, and pivoted means mounted on said rear section for securing a photographic appliance movably to said rear section to swing from an inverted carrying position within said case and partly within the rear section thereof when the two sections thereof are closed to an upstanding operative position substantially entirely outside of said rear section when the two sections of the case are open.

7. An ever-ready case for a photographic appliance, comprising a rear case section and a front case section mating with each other at an approximately vertical joint, a gasket on one of said sections extending around the perimeter of said joint in position to be engaged by the other of said sections to form a tight seal between the two sections when they are closed, hinge means connecting the two sections to each other adjacent their bottom ends so that said front section may swing forwardly and downwardly relative to said rear section while the latter remains substantially stationary, a bail-like handle pivotally mounted on said front section for swinging movement relative thereto through approximately 180 degrees, a pair of clamping hooks eccentrically mounted on said handle for engaging said rear section to draw the two sections tightly together when said two sections are in predetermined position relative to each other and said handle is swung from one predetermined position to another predetermined position, and pivoted means mounted on said rear section for securing a photographic appliance movably to said rear section to swing from an inverted carrying position within said case and partly within the rear section thereof when the two sections thereof are closed to an upstanding operative position substantially entirely outside of said rear section when the two sections of the case are open, abutment members projecting outwardly from said rear section for engagement by said clamping hooks mounted on said front section, and springs tending to hold said clamping hooks in predetermined angular position with respect to said handle, said springs flexing to allow angular swinging movement between said handle and said hooks after said hooks engage said abutment members and can swing no further.

8. A construction as defined in claim 6, in which the hinge means connecting the two sections to each other has loose play enabling the two sections to move bodily toward and away from each other to a limited extent, so that said clamping hooks may draw the sections tight against said gasket throughout the entire perimeter thereof.

9. A construction as defined in claim 6, further including double-acting dead-center spring means tending to swing said two sections toward fully opened or fully closed positions relative to each other.

10. A carrying case for a photographic camera of the twin lens reflex type having a focusing screen and a focusing hood located at the top of the camera when it is in normal picture-taking position, said carrying case comprising a hollow body section having walls forming, when in normal carrying position, a top, a bottom, two laterally spaced sides, and a back wall, said body section being substantially completely open at the front, a cover section hinged to said body section substantially at the bottom thereof to swing from a closed position forwardly and downwardly to an open position lying substantially entirely below the bottom of said body section to leave the open front of said body section substantially entirely unobstructed, a carrying strap securing means on each of said laterally spaced sides, a carrying strap extending between said securing means by which said body section may be supported in substantially stationary position both in said closed and open positions of said cover section, and a camera carrier hinged to said body section substantially at the top thereof to swing, when the cover section is in open position, through approximately 180 degrees from a downwardly faced position lying below the top of said body section to an upwardly faced position overlying said top of said body section, so that a camera mounted on said carrier may hang downwardly therefrom in a pendant position within said carrying case when said carrier is in said downwardly faced position and said cover section is closed, and may swing forwardly and upwardly to an upstanding position on top of said case when said cover section is open and said carrier is in said upwardly faced position.

References Cited in the file of this patent

UNITED STATES PATENTS

| | | |
|---|---|---|
| 2,176,865 | Floyd | Oct. 17, 1939 |
| 2,223,219 | Mayerovitz | Nov. 26, 1940 |
| 2,290,307 | Wicker | July 21, 1942 |
| 2,464,067 | Barker | Mar. 8, 1949 |
| 2,535,152 | Nelson | Dec. 26, 1950 |

FOREIGN PATENTS

| | | |
|---|---|---|
| 1,069,808 | France | Feb. 17, 1954 |